United States Patent
Nishida et al.

(10) Patent No.: US 6,744,585 B1
(45) Date of Patent: Jun. 1, 2004

(54) MAGNETIC RECORDING MEDIUM AND METHOD FOR REPRODUCING MAGNETIC RECORDING

(75) Inventors: Tetsuji Nishida, Kanagawa (JP); Satoshi Matsubaguchi, Kanagawa (JP); Takeshi Nagata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/557,857

(22) Filed: Apr. 26, 2000

(30) Foreign Application Priority Data

Apr. 30, 1999 (JP) ............................................. 11-124150

(51) Int. Cl.[7] .............................. G11B 5/09; G11B 5/00
(52) U.S. Cl. .................................. 360/65; 428/694 BS
(58) Field of Search ..................... 360/65; 428/694 BS, 428/694 BB, 694 BA, 216, 336; 29/603

(56) References Cited

U.S. PATENT DOCUMENTS

| | | | | |
|---|---|---|---|---|
| 5,358,777 A | * | 10/1994 | Kojima et al. | 428/212 |
| 5,633,068 A | * | 5/1997 | Ryoke et al. | 428/143 |
| 5,958,565 A | | 9/1999 | Hattori et al. | 428/212 |
| 6,139,937 A | * | 10/2000 | Sato et al. | 428/141 |
| 6,378,107 B1 | * | 4/2002 | Yoshinaka | 714/795 |

* cited by examiner

Primary Examiner—David Hudspeth
Assistant Examiner—Varsha A. Kapadia
(74) Attorney, Agent, or Firm—Stroock & Stroock & Lavan LLP

(57) ABSTRACT

Provision of a highly reliable magnetic recording medium with able to record further high density recording, usable advantageously as a magnetic tape for recording computer data, and having a further improved SNR, and a method for reproducing signals magnetically recorded on a magnetic recording medium to reproduce more desirably magnetic recording such as computer data with high density recording or the like. The magnetic recording medium having, on either side of a flexible nonmagnetic support, a nonmagnetic layer containing a nonmagnetic powder and a binder, and a magnetic layer containing a ferromagnetic powder and a binder, having a thickness in the range of from 0.2 to 0.6 $\mu$m in this order, where a laminated head is used for reproduction. The method for reproducing signals magnetically recorded medium having, on either side of a flexible nonmagnetic support, a nonmagnetic layer containing a nonmagnetic powder and a binder, and a magnetic layer, with a thickness ranging from 0.2 to 0.6 $\mu$m, containing a ferromagnetic powder and a binder in this order, where a laminated head is used as a reproducing head.

17 Claims, 2 Drawing Sheets

Ferrite head

Glass part

Ferrite part

Eddy currents are easily produced in high frequency. It is widely used for recording and reproducing.

Laminated head

Laminated part (Sendust or the like)

Base plate part (Ceramic or the like)

Nonmagnetic layers (Si or the like)

Eddy currents are hardly produced. It is exclusively used as a reproducing head.

MAGNETIC RECORDING MEDIUM AND METHOD FOR REPRODUCING MAGNETIC RECORDING

BACKGROUND OF THE INVENTION

1. Field of the Invention

This invention relates to a magnetic recording medium, and more particularly, to a magnetic recording medium suitable for magnetic recording/reproduction systems for a high frequency recording with a further narrowed data-recording track width as well as advantageously available as a magnetic tape for recording computer data.

The invention also relates to a method for reproducing magnetic signals recorded in the above magnetic recording medium.

2. Description of Related Art

In recent years, along with popularization of mini computers, personal computers and office computers such as work stations, magnetic tapes for recording computer data as external recording media (so-called backup tapes) are used. It has been required for such backup tapes to have a large recording capacity and a high running durability along with the improvement of a computer information processing ability and the acceleration of processing speed. With spreading of the computer-using environments, the backup tapes are desired to have no occurrence of errors during recording and reproducing data, with high reliability, even under a variety of environmental conditions (especially, under the conditions with high fluctuations of temperature and humidity).

Various magnetic recording media have been developed with the aim at improving an output that corresponds to the shortest recording wavelength ($\lambda$), especially to cope with high densification of magnetic recordings. For example, such a trial has been made as improving an analog SNR (Signal-to-Noise Ratio), thus to improve the SNR of signals by making a thickness of the magnetic layer 1.0 $\mu$m or thinner, in a magnetic recording medium with a simultaneous multilayer structure which is a lamination of a nonmagnetic layer and a magnetic layer in this order on a flexible nonmagnetic support. With respect to digital signals, the SNR of the digital signals has been improved by improving an output at a high frequency equivalent to the shortest magnetization-reversing interval, thereby improving an error rate of the digital data with improving SNR of digital signals.

It has been tried that a laminated head is used as a reproducing head, mainly in a digital VTR for broadcast use or the like, for the purpose of improving an output and an SNR at the high frequency range. A laminated head here refers to a head with a structure forming magnetically superior sendust layers in the thickness direction of the conventional bulk ferrite head and accumulating magnetically separated layers (See, FIG. 1). The magnetically separated layers can be formed in the thickness direction by sandwiching the nonmagnetic layers, e.g., Si layers, in the thickness direction. A laminated head has a feature that an eddy current loss is hardly generated, especially in the high frequency range because each of the magnetic characteristics is separated between the thin layers in the thickness direction. This means that the laminated head has excellent characteristics in the high frequency range in comparison with a ferrite head.

Those challenges have been made to enhance an output in the high frequency area, make a good SNR with respect to digital signals and improve an error rate, by using such a laminated head exclusively as a reproducing head. However, SNR generated from using combination of a magnetic recording medium having the above-mentioned simultaneous multilayer structure and the laminated head is not enough to accomplish further high density recording such an improvement from DDS (Digital Data Storage)-3 to DDS-4 that specifications are shown in Table 1 as follows, and therefore further SNR improvement is required.

TABLE 1

| The Difference between DDS-3 and DDS-4 | | |
|---|---|---|
| | DDS-4 (High density) | DDS-3 |
| Recording wavelength equivalent to the shortest magnetic flux reversing interval | 0.33 $\mu$m | 0.33 $\mu$m |
| Recording track pitch | 6.8 $\mu$m | 9.1 $\mu$m |
| Frequency for use (equivalent to the shortest magnetic flux reversing interval) | 40 MHz–54 MHz | 18–20 MHz |
| Total thickness of the tape | 5.6 $\mu$m | 6.8 $\mu$m |
| Capacity (per one cartridge) | 20 GB | 12 GB |

DDS-4 becomes high density because the track pitch becomes narrow comparing with DDS-3 system. The frequency used in the DDS-4 is twice as higher as that of the frequency used in the DDS-3.

SUMMARY OF THE INVENTION

It is an object of the invention to provide a highly reliable magnetic recording medium allowing to provide further high density recording, serving advantageously as a magnetic tape for recording computer data, and having a further improved SNR.

It is another object of the invention to provide a method for reproducing signals magnetically recorded on a magnetic recording medium to make it possible to reproduce better magnetic recording such as computer data with high density recording.

The inventors have found out that, an excellent SNR and a low error rate that have not been obtained with conventional magnetic recording media are gained by reproducing magnetic signals, using a laminated head, recorded in a magnetic recording medium which comprises a magnetic layer and a nonmagnetic layer on a support, in which a thickness of the magnetic layer in a limited specific range.

The invention relates to a magnetic reproducing method which comprises detecting with a laminated head as a reproducing head, magnetic signals recorded on a magnetic recording media comprising a flexible nonmagnetic support having, in order, a nonmagnetic layer containing a nonmagnetic powder and a binder and a magnetic layer having a thickness in the range of from 0.2 to 0.6 $\mu$m and containing a ferromagnetic powder and a binder.

BRIEF DESCRIPTION OF THE DRAWINGS

The above and other objects and features of the invention are apparent to those skilled in the art from the following referred embodiments thereof when considered in conjunction with the accompanied drawings, in which.

MODE FOR CARRYING OUT THE INVENTION

Figure 1:
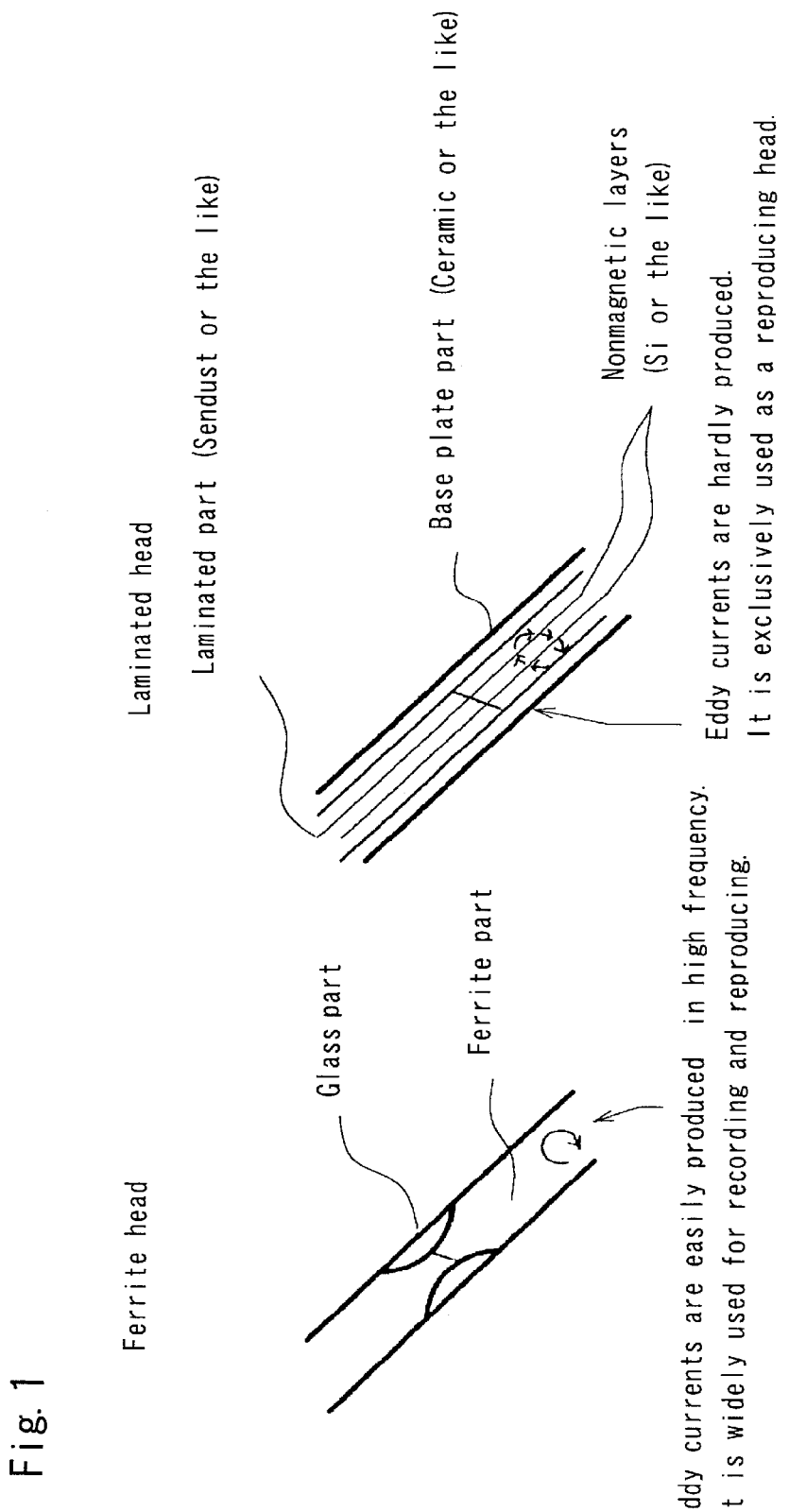
FIG. 1 is an illustration comparing a laminated head and a bulk ferrite head.

Since the magnetic recording medium of the invention can be used advantageously as a magnetic tape for recording especially computer data, examples of magnetic tapes for recording computer data (hereinafter simply referred to as a magnetic tape) are explained as follows.

The thickness of the magnetic layer of the invention is in the range of from 0.2 to 0.6 µm, preferably from 0.23 to 0.5 µm, and more preferably from 0.24 to 0.45 µm. A magnetic tape exhibiting a low error rate and a high SNR value of 12 dB or higher measured with the method specifically demonstrated in the examples described later can be obtained by making the thickness of the magnetic layer in the above range.

It is desirable for the magnetic tape of the invention to have a total thickness of the tape of, for example, 3.0 to 6.0 µm, a thickness of the nonmagnetic layer of, for example, in the range of from 0.3 to 1.8 µm, and a combined thickness of the magnetic layer with the nonmagnetic layer in the range of from 0.4 to 2.0 µm from a viewpoint to secure smoother surface property of the magnetic tape by a leveling effect of the lower nonmagnetic layer. In addition, a ratio of the thickness of the magnetic layer to the total thickness of the magnetic layer and the nonmagnetic layer is preferably in the range of from 0.05 to 0.4 from a viewpoint that it becomes easier to obtain, for example, a uniform magnetic layer with less changes in thickness fluctuations by a simultaneous multilayer coating method.

Nonmagnetic Layer

A nonmagnetic layer is composed of a nonmagnetic powder and a binder. According to the magnetic tape of the invention, the nonmagnetic layer even added with the magnetic powder is included in the meaning of a "nonmagnetic layer" of the invention as long as recording and reproducing magnetic signals with a magnetic tape having such a nonmagnetic layer is made without any problem in the magnetic recording/reproduction system. Generally, the nonmagnetic layer can contain lubricants other than those components.

A nonmagnetic inorganic powder and carbon black can be exemplified as the nonmagnetic powder used in the nonmagnetic layer.

The nonmagnetic inorganic powder usable in the invention has the Mohs' scale of hardness equal to or higher than 3 (preferably 5 or higher, more preferably 6 or higher) For example, metal, metal oxide, metal carbonate, metal sulfate, metal nitride, metal carbide and metal sulfide can be exemplified as the nonmagnetic inorganic powder.

Specific examples of the nonmagnetic inorganic powder include titanium dioxide (rutile type and anatase type), TiOx (x=1.3 to 1.95), cerium oxide, tin oxide, tungsten oxide, ZnO, $ZrO_2$, $SiO_2$, chromium oxide ($Cr_2O_3$), α-alumina having an α-conversion rate of 90% or higher, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide and titanium carbide. These can be used individually or in combination. Within those above, preferable is titanium dioxide (titanium oxide), α-alumina, α-iron oxide or chromium oxide, and more preferable is titanium dioxide or α-iron oxide. Shape and size of the nonmagnetic inorganic powder are arbitrary. The nonmagnetic inorganic powders having different sizes or the like can be used in combination, or one kind of the nonmagnetic inorganic powder can be used alone by selecting a particle size distribution.

It is desirable for the nonmagnetic inorganic powder used in the invention to have following characteristics. The nonmagnetic inorganic powder preferably has a tap density of 0.05 to 2 g/cc. (more preferably, 0.2 to 1.5 g/cc) The nonmagnetic inorganic powder preferably has a moisture content of 0.1 to 5% by weight (more preferably, 0.2 to 3% by weight). The pH of the nonmagnetic inorganic powder is generally in the range of from 2 to 11, but especially, preferably from 4 to 10. The nonmagnetic inorganic powder generally has a specific surface area of 1 to 100 $m^2/g$ (preferably 5 to 70 $m^2/g$, more preferably 7 to 50 $m^2/g$). The crystallite size of the nonmagnetic inorganic powder is preferably in the range of from 0.01 µm to 2 µm. As for the particle size of the nonmagnetic inorganic powder, the powder in a particulate form has an average particle diameter of 0.1 µm or less (preferably 0.08 or less), and the powder in an acicular shape has a length of the major axis of 0.05 to 1.0 µm (preferably 0.05 to 0.5 µm) and the acicular ratio is in the range of from 5 to 20 (preferably 5 to 15). The oil absorption amount utilizing DBP (dibutyl phthalate) is usually 5 to 100 ml/100 g (preferably 10 to 80 ml/100 g, more preferably 20 to 60 ml/100 g). The SA (stearic acid) oil absorption amount is preferably 1 to 20 µmol/$m^2$ (more preferably 2 to 15 µmol/$m^2$). The roughness factor of the powder surface is desirably 0.8 to 1.5. The wetting heat to water at 25° C. is preferably 200 erg/$cm^2$ to 600 erg/$cm^2$. Also, a solvent having the wetting heat in this range can be used. The pH at the isoelectric point in water is preferably in the range of from 3 to 9, and the specific gravity is desirably 1 to 12 (more desirably 3 to 6). The nonmagnetic inorganic powder needs not be 100% pure, but that can be subjected to the surface treatment with other compounds (e.g., such materials as Al, Si, Ti, Zr, Sn, Sb, Zn or the like) according to the purposes, and then the oxides of those may be formed on the surface. Effects can be provided as long as the nonmagnetic inorganic powder has a purity of 70% or higher. The ignition loss is preferably 20% or lower.

The specific examples of the nonmagnetic inorganic powder include: UA5600 and UA5605 manufactured by Showa Denko K.K.; AKP-20, AKP-30, AKP-50, HIT-55, HIT-100, ZA-G1 manufactured by Sumitomo Chemical Co. Ltd.; G5, G7 and S-1 manufactured by Nippon Kogyo Co. Ltd.; TF-100, TF-120, TF-140 and R516 manufactured by Toda Kogyo Corporation; TTO-51B, TTO-55A, TTO-55B, TTO-55C, TTO-55S, TTO-55D, FT-1000, FT-2000, FTL-100, FTK-200, M-1, S-1, SN-100, R-820, R-830, R-930, R-550, CR-50, CR-80, R-680, TY-50 manufactured by Ishihara Sangyo Kaisha, Ltd.; ECT-52, STT-4D, STT-30D, STT-30 and STT-65C manufactured by Titan Kogyo K.K.; T-1 manufactured by Mitsubishi Materials Corporation; NS-O, NS-3Y and NS-8Y manufactured by Nippon Shokubai Co. Ltd.; MT-100S, MT-100T, MT-150W, MT-500B, MT-600B and MT-100E manufactured by Tayca Corporation; FINEX-25, BF-1, BF-10, BF-20, BF-1L and BF-10P manufactured by Sakai Chemical Industry Co. Ltd.; DEFIC-Y and DEFIC-R manufactured by Dowa Mining Co. Ltd.; and Y-LOP manufactured by Titan Kogyo K.K. and those subjected to combustion.

It is desirable for 3 to 25% by weight of the nonmagnetic inorganic powder to be used to have 3 or higher (preferably 5 or higher, more preferably 6 or higher) of the Mohs' scale of hardness, functioned as, what is called, abrasives.

Carbon black is added for the purpose of securing smooth surface property of the magnetic layer formed on the nonmagnetic layer while preventing the magnetic layers from electrification by providing conductivity. The carbon black preferably has an average particle diameter of 35 nm or less (more preferably 10 to 35 nm), and the specific surface area is desirably 5 to 500 $m^2/g$ (more desirably 50 to 300 $m^2/g$).

The DBP oil absorption amount is preferably in the range of from 10 to 1000 ml/100 g (more preferably from 50 to 300 ml/100 g), and it is desirable to have pH of 2 to 10, a moisture content of 0.1 to 10%, and a tap density of 0.1 to 1 g/cc.

Such carbon black can be used as gained through various manufacture processes, for example, furnace black, thermal black, acetylene black, channel black and lampblack.

Examples of the specific commercial products of carbon black include BLACK PEARLS 2000, 1300, 1000, 900, 800, 700, and VULCAN XC-72 manufactured by Cabot Corporation; #35, #50, #55, #60, and #80 manufactured by Asahi Carbon Co. Ltd.; #3950B, #3750B, #3250B, #2400B, #2300B, #1000, #900, #40, #30 and #10B manufactured by Mitsubishi Chemical Corp.; CONDUCTEX SC, RAVEN 150, 50, 40, and 15 manufactured by Columbia Carbon Co.; Ketjen Black EC, Ketjen Black ECDJ-500 and Ketjeri Black ECDJ-600 manufactured by Lion Akzo Co. Ltd.

Usually, an adding amount of carbon black is 3 to 20 parts by weight, preferably 4 to 18 parts by weight, more preferably 5 to 15 parts by weight with respect to the nonmagnetic inorganic powder of 100 parts by weight.

Lubricants are added to ease frictions between the surface of the magnetic layer and the magnetic head, as well as between the guiding pole and the cylinder of the drive by exuding the lubricants on the surface of the magnetic layer, thereby maintaining a sliding and contacting state smoothly. Fatty acid and fatty acid ester are exemplified as lubricants. The following aliphatic carboxylic acids or the mixture of these can be exemplified as fatty acid, such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, palmitoleic acid and the like.

The following ester compounds can be exemplified as fatty acid ester, such as butyl stearate, sec-butyl stearate, isopropyl stearate, butyl oleate, amyl stearate, 3-methylbutylstearate, 2-ethylhexyl stearate, 2-hexyldecyl stearate, butyl palmitate, 2-ethylhexyl myristate, mixture of butyl stearate and butyl palmitate, oleyl oleate, butoxyethyl stearate, 2-butoxy-1-propyl stearate, dipropyleneglycol monobutyl ether subjected to acylation with stearic acid, diethylene glycol dipalmitate, diol produced through acylation of hexamethylenediol with myristic acid, oleate of glycerin or the like. Each of them can be used alone or in combination, and a combination of fatty acid with fatty acid ester is especially preferable.

The adding amount of lubricants is generally in the range of from 0.2 to 20 parts by weight (preferably from 0.2 to 15 parts by weight) with respect to the 100-part total amount of the nonmagnetic powder in the nonmagnetic layer.

Magnetic Layer

A magnetic layer is a layer containing a ferromagnetic powder and a binder. The magnetic layer generally includes lubricants, conductive powders (e.g., carbon black) and abrasives.

Examples of the ferromagnetic powder to be used include magnetic iron oxide expressed by the formula FeOx (x=1.33 to 1.5) or Co modified FeOx (1.33 to 1.5), ferromagnetic alloy powders (ferromagnetic metal powders) having Fe, Ni or Co as a main component (75% or higher), and plate-form hexagonal barium ferrite powders. Using the ferromagnetic alloy powder is especially desirable.

Other than the prescribed atoms, the ferromagnetic powder may contain at least an atom, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn Ni, Sr, or B.

Before dispersed, the ferromagnetic powder may be treated with, for example, dispersants, lubricants, surfactants, or antistatic agents.

The ferromagnetic alloy powder may contain a small amount of hydroxide or oxide.

A ferromagnetic alloy powder obtained from publicly known manufacturing methods can be used. The following methods can be exemplified.

The examples include a method for reducing a composite oxalate with reductive gas such as hydrogen, a method for obtaining Fe or Fe—Co particles by reducing the iron oxide with reductive gas such as hydrogen, a method for thermally decomposing the metal carbonyl compounds, a method for adding reducing agents such as sodium boron hydride, hypophosphite, or hydrazine to ferromagnetic metal solution for reduction, and a method for obtaining a micro powder by evaporating metals in low-pressure inert gas.

The ferromagnetic alloy powder thus obtained can be subjected to any of the publicly known slow oxidation treatment methods, or a method of dipping the powder in an organic solvent before drying, a method of dipping the powder in an organic solvent and feeding oxygen-containing gas to form an oxide coating on the surface of the powder before drying, and a method of adjusting the partial pressures of oxygen gas and inert gas without using an organic solvent, thus to form an oxide coating on the surface of the powder.

The particle of the above ferromagnetic alloy powder preferably has a specific surface area of 30 to 70 $m^2/g$ and a crystallite size of 50 to 300 angstroms given by the X-ray diffraction method. If the specific surface area is too small, it is impossible to respond fully to high density recording, or if the specific surface area is too large, it is also impossible to respond to high density recording because diffusions cannot be fully made, thus making it impossible to form the magnetic layer with a smooth surface.

The ferromagnetic alloy powder at least contains Fe. Specifically, such a metal alloy is exemplified as having Fe—Co, Fe—Ni, Fe—Zn—Ni or Fe—Ni—Co as a main component. Fe might be used alone. Regarding the magnetic characteristics of the ferromagnetic alloy powder, the saturation magnetization amount (saturation magnetic flux density) ($\sigma s$) is 110 emu/g or higher, preferably from 120 or higher to 170 emu/g or lower to accomplish high recording density. The coercive force (Hc) is in the range of from 1900 to 2600 oersteds (Oe) (preferably from 2000 to 2500 Oe). Also, the powder has an average length of the major axis (i.e., an average particle diameter) of 0.5 $\mu$m or less, preferably 0.01 to 0.3 $\mu$m provided by a transmission electron microscope, and an average axial ratio (a length of the major axis to a length of the minor axis, an acicular ratio) of 5 to 20, preferably 5 to 15.

Element such as B, C, Al, Si, P, rare earth metal including Y and Nd or the like, or the salt or oxide of those can be included to the composition for further improving the characteristics. An oxide layer is usually formed on the particle surface of the metal powder for chemically stabilizing.

Plate-form hexagonal ferrite is a tabular ferromagnetic material having an axis of easy magnetization in a vertical direction on the tabular surface, and the followings are included as examples such as barium ferrite (magnetoplumbate type or magnetoplumbate type containing partially a spinel phase), strontium ferrite (magnetoplumbate type or magnetoplumbate type containing partially a spinel phase), lead ferrite, calcium ferrite, or those cobalt substitution products. In particular, a cobalt substitution product of barium ferrite and a cobalt substitution product of strontium ferrite are desirable among these. As the plate-form hexagonal ferrite used in the invention, the ferrite added with, if necessary, such an element as Co—Ti, Co—Ti—Zr, Co—Ti—Zn, Ni—Ti—Zn or Ir—Zn or the like can be used for controlling coercive force.

With regard to the plate-form hexagonal ferrite powder, a plate size refers to a plate width of the hexagon plate-form particle measurable with electron microscopes. It is preferable for the plate-form hexagonal ferrite powder to have a particle size (plate size) of 0.001 to 1.0 $\mu$m, a plate-form ratio (plate size/plate thickness) of 2 to 20, and a specific surface area of 1 to 60 m$^2$/g. The plate-form hexagonal ferrite powder with too large or too small particle size causes difficulty in high density recording from the same reason as that of the ferromagnetic metal powder.

As for the magnetic characteristics of the plate-form hexagonal ferrite powder, the saturation magnetization ($\sigma$s) is at least 50 emu/g or higher, preferably 53 emu/g or higher to accomplish high recording density while the size as mentioned above is required, and the coercive force (Hc) is in the range of from 700 to 2000 oersteds (Oe), preferably in the range of from 900 to 1600 Oe.

The moisture content of the explained ferromagnetic powder is desirably 0.01 to 2% by weight, and the moisture content is preferably optimized depending on the kinds of the binders. It is desirable to optimize pH of the ferromagnetic powder by combination with a binder to be used, and the pH is generally in the range of from 4 to 12, preferably in the range of from 5 to 10. The ferromagnetic powder may be subjected to the surface treatment, if necessary, with Al, Si, P, or these oxides. The amount to be used in the surface treatment is generally 0.1 to 10% by weight with respect to the ferromagnetic powder. Applying the surface treatment can keep absorption of a lubricant such as fatty acid to 100 mg/m$^2$ or lower. Although the ferromagnetic powder might contain an inorganic ion such as soluble Na, Ca, Fe, Ni, Sr or the like, the characteristics are not affected as long as it is 5000 ppm or lower.

The lubricants containable in the nonmagnetic layer mentioned above can be used. The adding amount of the lubricant is generally in the range of from 0.2 to 20 parts by weight (preferably from 0.2 to 15 parts by weight) with respect to the ferromagnetic powder of 100 parts by weight.

The carbon black containable in the nonmagnetic layer mentioned above can be used. In the case of the carbon black used in the magnetic layer, however, the average particle diameter is preferably in the range of from 5 m$\mu$ to 350 m$\mu$ (more preferably from 10 m$\mu$ to 300 m$\mu$). Two or more kinds of carbon black, having different average particle diameters can be used.

The adding amount of the carbon black is generally in the range of from 0.1 to 30 parts by weight (preferably from 0.2 to 15 parts by weight) with respect to the ferromagnetic powder of 100 parts by weight.

As the abrasives mentioned above, for example, fused alumina, silicon carbide, chromium oxide ($Cr_2O_3$), corundum, diamond, garnet, and emery (main components: corundum and magnetite) can be mentioned. These abrasives have the Mohs' scale of hardness of 5 or higher (preferably 6 or higher), and they have preferably an average particle size of 0.05 to 1 $\mu$m (more preferably 0.2 to 0.8 $\mu$m).

The adding amount of the abrasives is generally in the range of from 3 to 25 parts by weight (preferably 3 to 20 parts by weight) with respect to the ferromagnetic powder of 100 parts by weight.

Back Coating Layer

The magnetic tape of the invention can have a back coating layer on a surface of support, which is an opposite side of the surface of the support forming the nonmagnetic layer and the magnetic layer.

It is desirable for the back coating layer to contain carbon black, and, as an inorganic powder, a soft inorganic powder having 3 to 4.5 of the Mohs' scale of hardness as well as a hard inorganic powder having 5 to 9 of the Mohs' scale of hardness.

Two or more kinds of carbon black having a respective different average particle size can be used in the back coating layer. In this case, it is preferable to use first carbon black having an average particle size of 10 to 20 nm and second carbon black having an average particle size of 230 to 300 nm. Generally, both the surface electric resistance and the light transmittance of the back coating layer can be set low by adding the first carbon black. Because there are many devices for magnetic recording, depending on their kinds, using signals of movements by taking advantage of light transmittance of tapes, the addition of the first carbon black provides effectiveness especially in such a case. The first carbon black, generally excelling in retention of liquid lubricants, contributes to the decrease in the friction coefficient when the lubricants are simultaneously used. On the other hand, the second carbon black having a particle size of 230 to 300 nm functions as a solid lubricant, and forms projections on the surface of the back layer, thereby contributing to the reduction of the contacting area and to the decrease in the friction coefficient. The rough-particle carbon black, however, is easy to come off from the back coating layer by sliding and sweeping movements in a severe running system, thus having a defect that leads to an increase in an error rate. As for the carbon black usable in the invention, Carbon Black Binran (Carbon Black Handbook) edited by Carbon Black Association can be referred.

When the two kinds of carbon black having different average particle sizes are used in the back coating layer, the containing ratio (weight ratio) of the first carbon black having 10 to 20 nm to the second carbon black having 230 to 300 nm is preferably in the range of from 98:2 to 75:25, more preferably from 95:5 to 85:15.

The content of the carbon black (or the total amount when two kinds are used)in the back coating layer is generally in the range of from 30 to 80 parts by weight, preferably 45 to 65 parts by weight with respect to a binder of 100 parts by weight.

Generally, a magnetic tape for recording computer data as that of the invention is strongly required to have a repeating running ability in comparison with videotapes or audiotapes. The soft inorganic powder having the Mohs' scale of hardness of 3 to 4.5 is preferably added to the magnetic tape of such use, therefore the stabilization of the friction coefficient by the repeating running can be achieved. Moreover, the Mohs' scale of hardness of 3 to 4.5 never grinds the sliding and sweeping guiding pole. The soft inorganic powder with the Mohs' scale of hardness of 3 to 4.5 preferably has an average particle size in the range of from 30 to 50 nm.

Examples of the soft inorganic powder having the Mohs' scale of hardness of 3 to 4.5 include calcium sulfate, calcium carbonate, calcium silicate, barium sulfate, magnesium carbonate, zinc carbonate and zinc oxide. Each of them can be used alone, or in combination of two or more. Among those above, calcium carbonate is especially desirable.

The content of the soft inorganic powder in the back coating layer is preferably in the range of from 10 to 140 parts by weight, more preferably in the range of from 35 to 100 parts by weight with respect to the carbon black of 100 parts by weight.

The hard inorganic powder having the Mohs' scale of hardness of 5 to 9 is used for the purpose of providing the repeating running durability with the tape to strengthen the back coating layer. When the inorganic powder is used with the above-mentioned carbon black or the soft inorganic powder, a strong back coating layer is provided with less deterioration due to the repeating sliding and sweeping movements. The use of the inorganic powder having the Mohs' scale of hardness of 5 to 9 produces adequate grinding force, thereby decreasing the adhesion of the chips by grinding or the like to the tape guiding pole or the like. In particular, when the powder is used together with calcium carbonate, the sliding and sweeping property with respect to the rough surface of the guiding pole is improved, thus it is also possible to attempt the stabilization of the friction coefficient of the back coating layer.

The hard inorganic powder having the Mohs' scale of hardness of 5 to 9 has an average particle size preferably in the range of from 80 to 250 nm (more preferably in the range of from 100 to 210 nm).

As the hard inorganic powder having the Mohs' scale of hardness of 5 to 9, for example, $\alpha$-iron oxide, $\alpha$-alumina and chromium oxide ($Cr_2O_3$) can be mentioned. These powders may be used alone or in combination. Among these, preferable is $\alpha$-iron oxide or $\alpha$-alumina.

The content of the hard inorganic powder having the Mohs' scale of hardness of 5 to 9 is usually 3 to 30 parts by weight, preferably 3 to 20 parts by weight with respect to the carbon black of 100 parts by weight.

The back coating layer preferably contains two kinds of inorganic powders having specific average particle sizes and different values of the Mohs' scale of hardness, and two kinds of carbon black having the different average particle sizes. In this combination, it is especially desirable to contain calcium carbonate as the soft inorganic powder.

When the soft inorganic powder and the hard inorganic powder are used together in the back coating layer, it is preferable to select the soft inorganic powder and the hard inorganic powder so that the difference in the hardness between the soft inorganic powder and the hard inorganic powder is to be 2 or higher (more preferably 2.5 or higher and further preferably 3 or higher).

In the back coating layer, the containing ratio (weight ratio) of the two kinds of inorganic powders having the specific average particle sizes and the different values of the Mohs' scale of hardness to the two kinds of the carbon black having different specific particle sizes is preferably in the range of from 70:30 to 30:70, more preferably in the range of from 65:35 to 35:65.

The back coating layer can contain lubricants. The lubricants can be used by choosing properly from those exemplified as the lubricants usable in the nonmagnetic layer or the magnetic layer.

The lubricants are added in the back coating layer, generally in the range of from 1 to 5 parts by weight with respect to the binder of 100 parts by weight.

Binders

As the binder used for forming the nonmagnetic layer, magnetic layer and the back coating layer, for example, thermoplastic resins, thermosetting resins, reactive resins or the mixture of these resins can be mentioned.

As examples of the thermoplastic resins, a polymer or copolymer containing, as an unit, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether can be mentioned. As examples of the copolymer, for example, vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, acrylate-styrene copolymer, metacrylate-acrylonitrile copolymer, metacrylate-vinylidene chloride copolymer, metacrylate-styrene copolymer, vinylidene-acrylonitrile copolymer, butadiene-acrylonitrile copolymer, styrene-butadiene copolymer, or chlorovinyl ether-acrylate copolymer can be mentioned.

Other than those above, polyamide resins, cellulose-base resins (cellulose acetate butyrate, cellulose diacetate, cellulose propionate, nitrocellulose or the like), polyvinyl fluoride, polyester resins, polyurethane resins and various kinds of rubber-base resins can be used.

As the thermosetting resins or the reactive resins, for example, phenolic resins, epoxy resins, polyurethane setting resins, urea resins, melanin resins, alkyd resins, acrylic reactive resins, formaldehyde resins, silicone resins, epoxy-polyamide resins, a mixture of polyester resins and polyisocyanate prepolymer, a mixture of a polyester polyol and polyisocyanate, and a mixture of polyurethane and polyisocyanate can be used.

As polyurethane resins, publicly known resins can be used as having such a structure of a polyester polyurethane, a polyether polyurethane, a polyether polyester polyurethane, a polycarbonate polyurethane, a polyester polycarbonate polyurethane, a polycaprolactone polyurethane or the like.

As a polyisocyanate as an hardening agent, for example, isocyanates such as tolylene diisocyanate, 4,4'-diphenylmethane-diisocyanate, hexamethylene diisocyanate, xylylene diisocyanate, naphthylene-1,5-diisocyanate, o-toluidine-diisocyanate, isophorone-diisocyanate and triphenylmethane-triisocyanate, products of these isocyanates with polyhydric alcohols, and polyisocyanatets formed through condensation of isocyanates can be mentioned.

It is desirable, in this invention, the binder in the magnetic layer, nonmagnetic layer and the back coating layer is preferably constituted of polyurethane resins and at least one resin selected from those resins such as a vinyl chloride resin, a vinyl chloride-vinyl acetate copolymer, a vinyl chloride-vinyl acetate-vinyl alcohol copolymer, a vinyl chloride-vinyl acetate-maleic anhydride copolymer and nitrocellulose, or that the binder with these resins is additionally added with a polyisocyanate as a hardening agent.

As a binder, at least a polar group selected from followings such as $-COOM$, $-SO_3M$, $-OSO_3M$, $-P=O(OM)_2$, $-O-P=O(OM)_2$ (where M indicates an hydrogen atom or an alkali metal), $-OH$, $-NR_2$, $=N^+R_3$ (where R indicates an hydrocarbon group), an epoxy group, $-SH$, $-CN$ or the like, and introduced through copolymerization or addition reaction is used, if necessary, to obtain the further excellent dispersibility and the durability of the layer thus to be obtained. Such a polar group is preferably introduced in the binder with the amount of $10^{-1}$ to $10^{-8}$ mol/g (more preferably, $10^{-2}$ to $10^{-6}$ mol/g) The binder is generally used in the range of from 5 to 50 parts by weight (preferably from 10 to 30 parts by weight) with respect to the ferromagnetic powder of 100 parts by weight in the magnetic layer, or the nonmagnetic powder of 100 parts by weight in the nonmagnetic layer. In the case of using vinyl chloride resins, polyurethane resins and polyisocyanate in combination as a binder for the magnetic layer or the nonmagnetic layer, it is preferable to contain, in the whole binder, the vinyl chloride resins of 5 to 70% by weight, the polyurethane resins of 2 to 50% by weight, and the polyisocyanate of 2 to 50% by weight.

The binder in the back coating layer is generally used in the range of from 5 to 250 parts by weight (preferably from 10 to 200 parts by weight) with respect to the carbon black in the back coating layer of 100 parts by weight.

Arbitrary Components

The coating liquid for forming the magnetic layer, nonmagnetic layer and back coating layer of the magnetic tape can be added with dispersants to disperse the magnetic powder or nonmagnetic powder or the like into the binder better. Each layer can be added, if necessary, with plasticizers, conductive particles (antistatic agents) other than the carbon black, or fungicides.

As a dispersant, for example, fatty acids (RCOOH, where R is an alkyl group or alkenyl group having a carbon number of 11 to 17) having a carbon number of 12 to 18 such as a caprylic acid, a capric acid, a lauric acid, a myristic acid, a palmitic acid, a stearic acid, a behenic acid, an oleic acid, an elaidic acid, a linoleic acid, a linolenic acid, stearolic acid or the like, metallic soap constituted of alkali metal or alkaline-earth metal of the fatty acids, a compound of the fatty acid ester containing fluorine, an amide of the fatty acids, a polyalkylene oxide alkyl phosphoric acid ester, a lecithin, trialkyl polyolefinoxy quaternary ammonium salt (where an alkyl has a carbon number of 1 to 5, an olefin is an ethylene, propylene or the like), a sulfate, copper phthalocyanine and so on may be used. Each of these can be used alone or in combination.

It is preferable to use, especially in the back coating layer, an oleic acid copper, a copper phthalocyanine and a barium sulfate in combination.

The dispersants are added to any of the layers in the range of from 0.5 to 20 parts by weight with respect to the binder of 100 parts by weight.

Support

As the flexible nonmagnetic support used in the invention, publicly known films can be used, for example, polyesters such as polyethylene terephthalate or polyethylene naphthalate, polyolefins, cellulose triacetate, polycarbonate, polyamide, polyimide, polyamideimides, polysulfone, aramids, aromatic polyamide and so on. These supports may be subjected beforehand to corona discharge treatment, plasma treatment, adhesion enhancing treatment, heat treatment, dust removing treatment or the like.

It is preferable to use aromatic polyamide from the viewpoint of preventing the head from touching improperly accompanied by lamellation of the total thickness of the tape for higher capacity. The support made of the aromatic polyamide preferably contains a repeating unit shown in, for example, the following formula (I) or (II).

—(NH—Ar$^1$—NHCO—Ar$^2$—CO)—     (I)

—(NH—Ar$^3$—CO)—     (II)

The Ar$^1$, Ar$^2$ and Ar$^3$ independently represent an aromatic ring (the aromatic ring may be condensed) or a group containing at least one aromatic ring.

The examples of the Ar$^1$, Ar$^2$ and Ar$^3$ can be mentioned as follows.

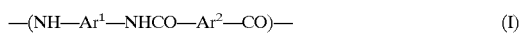

-continued

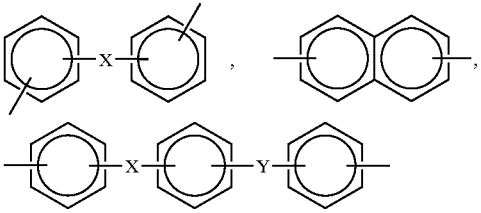

The X and Y here respectively represent a group chosen from —O—, —CH$_2$—, —CO—, —SO$_2$—, —S— or —C(CH$_3$)$_2$—.

The hydrogen atom of the above aromatic rings may be replaced.

Halogen atoms (especially chlorines), nitro groups, alkyls having a carbon number of 1 to 3 (especially methyl groups) or alkoxy groups having a carbon number of 1 to 3, for example, can be exemplified as groups or atoms able to substitute hydrogen atoms. The hydrogen atoms can be replaced in the amide bonding as structuring components for polymers.

It is desirable that the aromatic polyamide is a polymer where the aromatic rings bonded at the para position account for 50% or higher (more preferably 70% or higher) of the total aromatic rings. It is also preferable, from the viewpoint of decreasing wettability, that aromatic rings substituting halogen atoms (especially chlorine atoms) for hydrogen atoms on the aromatic rings are a polymer in which the aromatic rings accounts for 30% or higher of the total aromatic rings.

Although the aromatic polyamide is preferably constituted of the repeating units, represented as the (I) or (II), of 50 mole percent or higher, preferably 70 mole percent or higher, a copolymer of the repeating units represented as a formula (I) or (II) with other repeating units, or a polymer made by blending the repeating units of (I) or (II) with other repeating units can be used as long as the properties as a support are satisfied.

Using aramids (all aromatic polyamides) is desirable in the invention. As the typical examples of the products of the aramids, Mictron (manufactured by Toray Industries, Inc.), and Aramica (manufactured by Asahi Chemical Industry Co. Ltd.) can be mentioned.

The mentioned aromatic polyamides are described in Japanese Unexamined Patent Publication (KOKAI) Heisei No.8-55,327 or Japanese Unexamined Patent Publication (KOKAI) Heisei No.8-55,328.

The support made of the aromatic polyamides that used in the invention has the thickness in the range of preferably from 2.3 to 4.0 μm, more preferably from 2.3 to 3.8 μm.

Manufacturing Method

Conventional methods can be used for manufacturing the magnetic tape of the invention other than the case where the thickness of the magnetic layer is adjusted to be in the specific range. In other words, manufacturing the magnetic tape of the invention is carried out through a step for preparing coating liquid for each layer (1), a step for coating the support with the coating liquid thus obtained and drying it (2), a step of calendering treatment (3), a step for cutting (4), and a step for winding into a cartridge (5).

Followings are simple explanations for steps for preparing the coating liquid (magnetic paints) of the magnetic layer, as well as for coating the support with the coating liquid thus obtained (coating liquid for the magnetic layers and coating liquid for the nonmagnetic layers) before drying.

The step for preparing the magnetic paints is constituted at least of a kneading step, a dispersing step, and a mixing

step to be carried out, if necessary, before or after these steps. The individual step may be performed separately at two or more stages. The materials used in the invention such as a ferromagnetic powder, a binder, carbon black, abrasives, antistatic agents, lubricants, solvents or the like may be added at any of steps, or at the beginning of or during the step of those. Furthermore, the individual material may be divided and added in two or more steps. For example, a polyurethane resin may be divided and added in the kneading step, the dispersing step, and the mixing step for viscosity adjustment after dispersing.

The coating liquid for the nonmagnetic layer and the back coating layer can be prepared using the same method as mentioned above.

The conventional method is used for coating the support with the prepared coating liquids for the magnetic layer and the nonmagnetic layer, but it is preferable to use what is called "a wet on wet technique" as a coating method where the coating liquid for the nonmagnetic layer is applied to the support, and while the coated layer (nonmagnetic layer) thus to be formed is in a wet state, the coating liquid for the magnetic layer is coated on the nonmagnetic layer.

Following methods can be exemplified as coating methods using the wet on wet technique mentioned above.

(1) The first method: a nonmagnetic layer is first formed on the support by using a coating apparatus such as a gravure coating, roller coating, blade coating, or extrusion coating apparatus, and while the nonmagnetic layer is still in a wet state, a magnetic layer is formed by means of a support-pressing extrusion coating apparatus. (ref. Japanese Unexamined Patent Publication (KOKAI) Showa No. 60-238,179, Japanese Patent Publication (KOKOKU) Heisei No.1-46,186 and Japanese Unexamined Patent Publication (KOKAI) No.2-265,672).

(2) The second method: a magnetic layer and a nonmagnetic layer are formed almost simultaneously on the support by using a coating apparatus having single coating head with two built-in slits for passing coating liquid (See, Japanese Unexamined Patent Publication (KOKAI) Showa No.63-88,080, Japanese Unexamined Patent Publication (KOKAI) Heisei No.2-17,921 and Japanese Unexamined Patent Publication (KOKAI) Heisei No.2-265,672).

(3) The third method: a magnetic layer and a nonmagnetic layer are formed almost simultaneously on the support by using an extrusion coating apparatus with a backup roller (ref. Japanese Unexamined Patent Publication (KOKAI) Heisei No.2-174,965).

It is preferable in the invention to use a simultaneous multilayer coating method for carrying out the coating of the support with the coating liquids for the nonmagnetic layer and the magnetic layer. It is dried at a specified temperature after the coating.

It is desirable for the magnetic layer of the magnetic tape of the invention to be adjusted to have the surface roughness in the range of from 2.0 to 4.0 nm (more desirably from 2.5 to 3.5 nm, especially from 2.6 to 3.3 nm) according to the measurement with a 3D-MIRAU method (or three dimensional method) for obtaining high surface property.

The surface property of the back coating layer has a tendency of print-through on the surface of the magnetic layer in a winding state of the tape. Thus, it is preferable for the back coating layer to have a relatively high smoothness as well. It is desirable for the back coating layer of the magnetic tape of the invention to be adjusted to have the surface roughness, Ra (an average roughness at the center line of the 0.08 mm cutoff) in the range of from 0.0030 to 0.060 $\mu$m.

The surface roughness can be usually adjusted by the kind of the material used, the surface property, the pressure or the like of the calendering rolls to be used at the surface treatment process by the calender, usually after the coated film is formed.

Recording and Reproducing Method

The reproducing method of the magnetically recorded signals according to the invention is a method for reproducing the magnetically recorded signals on the magnetic recording medium (magnetic tape) of the invention, characterized in that a laminated head is used as a reproducing head. As for the magnetic recording to the magnetic tape according to the invention, it is preferable for a recording track pitch, for example, to be less than 9 $\mu$m, preferably in the range of from 5 to 8 $\mu$m, more preferably in the range of from 5 to 7 $\mu$m from the viewpoint that a laminated head with a reproducing track width of 12 $\mu$m or less prevents crosstalk from adjacent tracks. The frequency of the signals to be magnetically recorded is preferably in the range of from 0.5 to 60 MHz from the viewpoint of transferring digital signals at a high speed.

The magnetic recording of the signals to the magnetic tape of the invention can be carried out in a helical scan method with a rotary magnetic head. The helical scan method is preferable from the viewpoint that high capacity media can be obtained with a small cassette, thus requiring no servo track signals.

In the reproducing method of the magnetic recording signals according to the invention, a laminated head is used as a reproducing head. As shown in FIG. 1, for example, the laminated head has a structure forming magnetically superior sendust layers in the thickness direction of the bulk ferrite head and accumulating the magnetically separated layers. The magnetically separated layers can be formed in the thickness direction by sandwiching the nonmagnetic layers, e.g., Si layers, in the thickness direction. The laminated head has a feature that an eddy current loss is hardly generated, especially in the high frequency area because the magnetic characteristics are separated between the thin layers in the thickness direction. Using such a laminated head as a reproducing head provides excellent property for reproducing recorded in high frequency ranging from 30 to 100 MHz.

Furthermore, it is preferable to apply PRML-class 1(PR1) signal processing to the reproduced signals. The PR1 signal processing, one of the signal processing methods for accomplishing high density recording with digital magnetic recording, used in DDS-3 and DDS-4 data storage formats, is a detecting method with signal spectrums distributing from low area to high area.

By the use of the laminated head as a reproducing head, the magnetic tape of the invention can reproduce even the signals recorded in further narrow track pitches and at high frequency areas in comparison with the convention, with a high SNR and a low error rate. Therefore, this tape is the best as a magnetic tape for recording computer data in higher density recording.

EXAMPLES

The present invention is more specifically explained below by following examples and comparative examples.

"Parts" shown in below represent "parts by weight" if there is no explanation.

Example 1

[Preparation of the Coating Liquid for Forming the Nonmagnetic Layer and the Coating Liquid for Forming the Magnetic Layer]

| (Components for forming the nonmagnetic layers) | |
|---|---|
| Nonmagnetic powder Titanium dioxide (Rutile type) | 90 parts |
| [TiO$_2$ content: 90% or higher | |
| An average primary-particle diameter: 0.035 μm | |
| BET specific surface area: 40 m$^2$/g | |
| pH: 7.0 | |
| DBP oil absorption amount: 27 to 38 g/100 g | |
| The Mohs' scale of Hardness on: 6.0 | |
| Surface covering compound (Al$_2$O$_3$)] | |
| Carbon black | 10 parts |
| (Manufactured by Mitsubishi Carbon Co., Ltd.) | |
| [An average primary-particle diameter: 16 nm | |
| DBP oil absorption amount: 80 ml/100 g | |
| pH: 8.0 | |
| BET specific surface area: 250 m$^2$/g | |
| Volatile content: 1.5%] | |
| Vinyl chloride resin | 12 parts |
| containing polar groups (—SO$_3$K group, epoxy group) | |
| [(MR-110, manufactured by Nippon Zeon Co., Ltd.)] | |
| Polyester polyurethane resin containing polar groups | 5 parts |
| (—SO$_3$Na group) | |
| [Neopentyl glycol/caprolactonepolyol/MDI | |
| (4,4'-diphenylmethane-diisocyanate) = | |
| 0.9/2.6/1 (weight ratio) | |
| —SO$_3$Na group containing 1 × 10$^{-4}$ mol/g] | |
| Polyisocyanate | 3 parts |
| [(Coronate L manufactured by | |
| Nippon polyurethane Co. Ltd.)] | |
| Butyl stearate | 1 part |
| Stearic acid | 2 parts |
| Oleic acid | 1 part |
| Methyl ethyl ketone | 150 parts |
| Cyclohexanone | 50 parts |

| (Components for forming the magnetic layers) | |
|---|---|
| Ferromagnetic metal powder | 100 parts |
| [Composition/with respect to Fe: | |
| containing Co: 30% by atom; Al: 11.2% by atom; | |
| and Y: 6.3% by atom. | |
| Coercive force (Hc): 2350 oersteds (Oe) | |
| BET specific surface area: 47 m$^2$/g | |
| Crystallite size: 175 angstroms | |
| Saturation magnetization amount (σs): 147 emu/g | |
| Particle size | |
| (mean diameter of the major axis): 0.08 μm | |
| Acicular ratio: 7.5 | |
| pH: 9.4 | |
| Water-soluble Na: 5 ppm | |
| Water-soluble Ca: 10 ppm | |
| Water-soluble Fe: 10 ppm] | |
| Surface treatment agents for magnetic materials | 3 parts |
| [(phenyl phosphonic acid)] | |
| Vinyl chloride type copolymer | 10 parts |
| containing polar groups (—SO$_3$K group) | |
| [—SO$_3$K group content: 5 × 10$^{-6}$ mol/g; | |
| Degree of polymerization: 350; | |
| Epoxy group content: 3.5% by weight | |
| in a monomer unit; | |
| (MR-110 manufactured by Nippon Zeon Co., Ltd.)] | |
| Polyester polyurethane resin | 2.5 parts |
| containing polar groups (—SO$_3$Na group) | |
| [Neopentyl glycol/caprolactonepolyol/MDI = | |
| 0.9/2.6/1 (weight ratio) | |
| —SO$_3$Na group content 1 × 10$^{-4}$ mol/g] | |
| Polyisocyanate | 2.5 parts |
| [(Coronate L manufactured by | |
| Nippon polyurethane Co. Ltd.)] | |
| α-alumina [(particle size: 0.3 μm)] | 10 parts |
| Dichromium trioxide | 1 part |
| Carbon black [(Particle size: 0.10 μm)] | 3 parts |
| Butyl stearate | 1 part |
| Stearic acid | 2 parts |

| -continued | |
|---|---|
| Oleic acid | 1 part |
| Methyl ethyl ketone | 150 parts |
| Cyclohexanone | 50 parts |

Each component, excluding polyisocyanate, for forming the nonmagnetic layer or the magnetic layer was dispersed respectively using a sand mill after kneaded in a continuous kneader. The polyisocyanate was added to the each of obtained dispersing liquids, where 2.5 parts were added to the dispersing liquid for the nonmagnetic layer, 3 parts are added to the dispersing liquid for the magnetic layer. In addition, butyl acetate was added by 40 parts to each liquid, and each liquid was filtered using a filter having a mean pore diameter of 1 μm to prepare respective coating liquids for forming nonmagnetic layers and magnetic layers.

[Preparation of Coating Liquid for Forming Back Coating Layers]

| (Components for forming back coating layers) | |
|---|---|
| First carbon black powder | 100 parts |
| [(BP-800 having an average particle size of 17 mμ, | |
| manufactured by Cabot Corporation)] | |
| Second carbon black powder | 10 parts |
| [(Thermal black having an average particle size of 230 mμ, | |
| manufactured by Khan Carb Co., Ltd.)] | |
| Calcium carbonate | 80 parts |
| [(Hakuenka O having an average particle size of 40 nm | |
| and the Mohs' scale of hardness of 3.0, manufactured by | |
| Shiraishi Kogyo Co. Ltd.)] | |
| α-alumina | 5 parts |
| [(HIT 55 having an average particle size of 200 nm and | |
| the Mohs' scale of hardness of 8.5, manufactured by | |
| Sumitomo Chemical Co. Ltd.)] | |
| Nitrocellulose resin | 140 parts |
| Polyurethane resin | 15 parts |
| [N2301 manufactured by Nippon polyurethane Co. Ltd] | |
| Polyisocyanate | 40 parts |
| [(Coronate L manufactured by | |
| Nippon polyurethane Co. Ltd.)] | |
| Polyester resin | 5 parts |
| [a resin consisted of ethylene glycol, diethylene | |
| glycol, terephthalic acid and isophthalic acid, | |
| having molecular weight of 50,000] | |
| Dispersant: | |
| Copper oleate | 5 parts |
| Copper phthalocyanine | 5 parts |
| Barium sulfate | 5 parts |
| Methyl ethyl ketone | 2200 parts |
| Butyl acetate | 300 parts |
| Toluene | 600 parts |

Each component for forming the above back coating layer was dispersed using a sand mill after kneaded in a continuous kneader. The dispersing liquid thus obtained was filtered with a filter having a mean pore diameter of 1 μm to prepare the coating liquid for forming the back coating layer.

[Manufacture of the Magnetic Tape]

Figure 2:
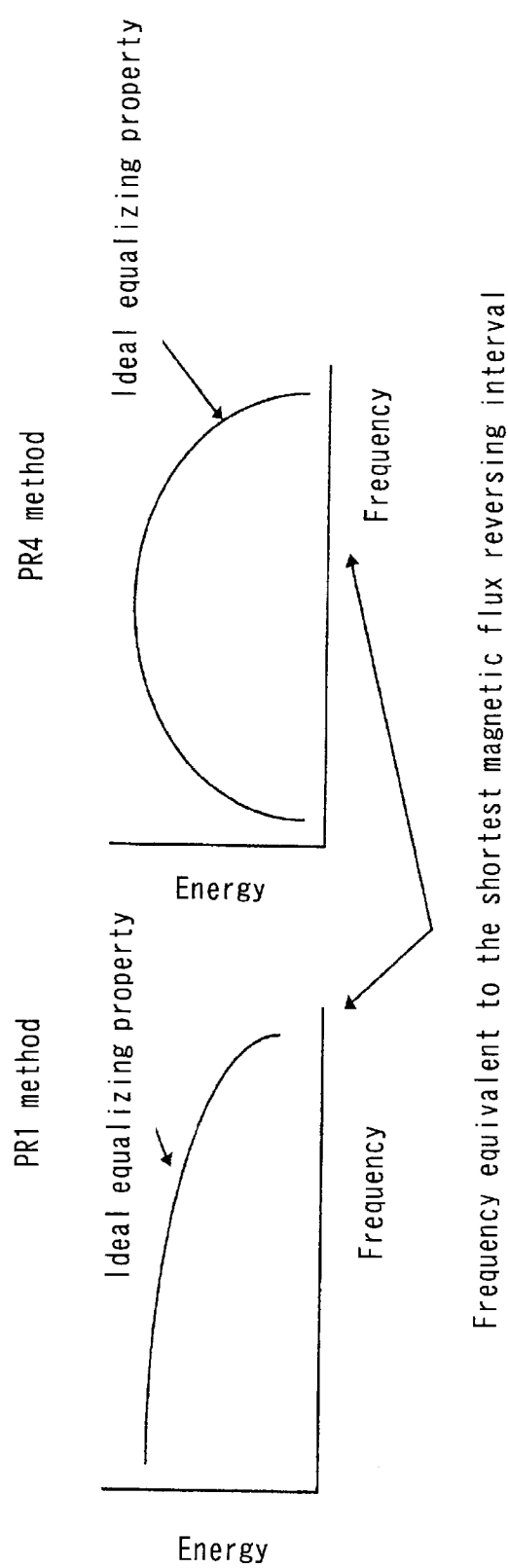
FIG. 2 is an illustration showing graphs of ideal equalizing curves of PR1 and PR4.

The simultaneous multilayer coating was made on the 20 long aramid support (product name: Mictron, having a thickness of 2.5 μm, manufactured by Toray Industries, Inc.) with the coating liquid for forming the nonmagnetic layer and the coating liquid for forming the magnetic layer so that the dried thickness of the nonmagnetic layer is to be 0.435 μm and on this layer, the dried thickness of the magnetic layer is to be in the range of from 0.1 to 1.0 μm (11 kinds), as shown in Table 2. Next, while both layers were still in a wet state, the layers were subject to orientation created by a cobalt-samarium magnet having a magnetic flux density of 3,000 gausses and a solenoid having a magnetic flux density of 1500 gausses, and then the both layers were dried to form a nonmagnetic layer and a magnetic layer. Only the magnetic layer with a thickness of 3 μm was formed in the "single layer" as shown in FIG. 2.

And then, the coating liquid for forming the back coating layer was applied to the other side of the aramid support (the opposite side to the magnetic layer) to produce a back coating layer having a dried thickness of 0.4 μm, and therefore a magnetic-recording laminate roll having a nonmagnetic layer and a magnetic layer on one side and a back coating layer on the other side of the support was obtained.

The magnetic-recording laminate roll thus obtained was subjected to a calendering treatment by passing the roll through six nips, each consisting of a pair of metal rolls (at temperature of 90° C. and liner pressure 300 kg/cm$^2$) and the roll was rolled up with tension of 5 kg.

The magnetic-recording laminate roll, after preserved, was then slit into a 3.8 mm width, thus producing the magnetic recording medium (a magnetic tape for recording computer data, referred thereafter as "a magnetic tape" simply) according to the invention. The obtained magnetic tape was wound in a cartridge for DDS to have a length of 180 m.

The surface roughness (a cutoff value: a centerline average roughness of 0.08 mm) of the back coating layer of the magnetic tape thus obtained was 4.5 nm.

Each SNR and error rate of the magnetic tapes thus obtained was measured with the following methods and the results are shown in Table 2 and Table 3.

[Measuring Method of SNR]

A DDS reconstructed apparatus was used as an evaluation apparatus so that single frequency was able to be recorded and reproduced in a drive.

Calculation of the SNR was given by CNR recording and reproducing single frequency of which frequency was a half of the recording frequency equivalent to the shortest reversing interval. SNR was given by the ratio of a noise, calculated by integrating noise components with whole bands, to an output. Noise components were integrated after gain corrections of whole noise components were made by excluding 500 KHz parts from neighboring parts of the reproducing carriers of the recording and reproducing frequencies. The gain correction was carried out by calculating the difference between frequency property of the tape and an ideal equalizing curve, thus producing each coefficient of the each frequency point. A process is shown as follows.

(1) Single frequency having ½ of the recording frequency equivalent to the shortest magnetic flux reversing interval was recorded and reproduced (10 MHz in this case), and the reproducing signals were measured with a spectrum analyzer, thus obtaining CNR.

(2) A level of the reproducing signals was checked, referring it as S level. The noise components were made to be a noise curve by excluding the ±500 KHz neighboring frequency of the reproducing signals.

(3) Each of the single frequencies from the low frequency area of 750 KHz to 1 MHz, the intermediate frequency area of 5 to 10 MHz, and high frequency area of 15 MHz or higher respectively was recorded and reproduced to examine frequency characteristics of the tape.

TABLE 2

Results of SNR measurements 12.0 dB or higher required
Units of each value: dB

| Upper layer thickness μm | 0.1 | 0.15 | 0.2 | 0.23 | 0.25 | 0.3 | 0.4 | 0.5 | 0.6 | 0.7 | 1.0 | Single layer |
|---|---|---|---|---|---|---|---|---|---|---|---|---|
| (i) Prior Art | 11.5 | 11.5 | 12.0 | 12.5 | 13.0 | 13.5 | 13.5 | 13.0 | 12.0 | 11.5 | 11.0 | 11.0 |
| (2) | 11.5 | 11.5 | 11.5 | 11.0 | 11.0 | 11.0 | 10.0 | 10.0 | 10.0 | 10.0 | 10.0 | 9.5 |
| (3) | 12.0 | 11.5 | 11.5 | 11.0 | 11.0 | 11.0 | 11.0 | 11.0 | 10.5 | 10.5 | 10.0 | 10.0 |

(1) Recording head: Metal in gap (Mig) head/Reproducing head: laminate head
(2) Recording head: Mig/Reproducing head: Ferrite
(3) Recording head: Mig/Reproducing head: Mig

TABLE 3

Results of Error Rate Measurements

1 × 10$^{-3}$ or lower required
Each value multiplied by 10$^{-3}$ (×10$^{-3}$)

| Upper Layer Thickness μm | 0.1 | 0.15 | 0.2 | 0.23 | 0.25 | 0.3 | 0.4 | 0.5 | 0.6 | 0.7 | 1.0 | Single Layer |
|---|---|---|---|---|---|---|---|---|---|---|---|---|
| (1) Prior Art | 2.0 | 2.0 | 1.0 | 0.9 | 0.6 | 0.7 | 0.7 | 0.9 | 0.9 | 2.0 | 5.0 | 10.0 |
| (2) | 1.5 | 1.5 | 2.0 | 2.5 | 4 0 | 5.0 | 7.0 | 10.0 | 10.0 | 25.0 | 30.0 | 50.0 |
| (3) | 1.0 | 2.5 | 3.0 | 5.0 | 5.0 | 5.5 | 6.0 | 6.0 | 10.0 | 11.0 | 20.0 | 30.0 |

(1) Recording head: Mig/Reproducing head: laminate head
(2) Recording head: Mig/Reproducing head: Ferrite
(3) Recording head: Mig/Reproducing head: Mig (4) Each correction coefficient for each frequency was calculated to get the frequency characteristics of the tape to match with the ideal equalizing curve (shown in FIG. 2) of the PR1, by comparing the frequency characteristics and the ideal equalizing curve of the PR1.

(5) A noise curve after equalization was given by multiplying the noise curve given in (2) by the correction coefficient given in (4), and integrated with respect to the whole frequency areas (from DC to 30 MHz in this case), thus making the result value as N noise level.

(6) SNR is given as a ratio of S level given in (2) to N level given in (5).

[Error Rate Measurement]

A tape feeding of the DDS-3 drive was changed to produce a recording track width of 6.8 μm, and digital signals chosen at random were recorded and reproduced to count errors detected, thus converting into a rate by making the total number of the recordings as a denominator. The denominator was given by the number of blocks per second.

[Magnetic Tape Evaluation]

In the case that a laminated head was used as a reproducing head, the magnetic tape of the invention having a magnetic layer with a specified thickness range (0.2 to 0.6 μm) showed an excellent SNR, or 12.0 dB or higher, as shown in the results of Table 2.

In comparison with it, the SNR was 11.5 dB or lower, however, even if a laminated head was used as a reproducing head, but when the thickness of the magnetic layer was other than that in the specified thickness range (0.15 μm or thinner, or 0.7 μm or thicker).

In addition, an excellent SNR of 12.0 dB or higher was not able to be gained without using a laminated head as a reproducing head, even if the thickness of the magnetic layer is in a specific range (0.2 μm to 0.6 μm).

In addition, as shown in the results of the above-mentioned Table 3, the magnetic tape of the invention having the thickness of the magnetic layer in the specific range (0.2 to 0.6 μm) had an error rate of $1.0 \times 10^{-3}$ or lower when a laminated head was used as a reproducing head.

In comparison with it, when the thickness of the magnetic layer is in a range other than that of the specified thickness (0.15 μm or thinner, or 0.7 μm or thicker), however, the error rate became high, or $2.0 \times 10^{-3}$ or higher, even if a laminated head was used as a reproducing head.

Furthermore, the error rate became high, or $1.0 \times 10^{-3}$ or higher without using a laminated head as a reproducing head, even if the thickness of the magnetic layer is in a specific range (0.2 to 0.6 μm).

The magnetic recording medium of the invention and the reproducing method, of the invention, for reproducing the magnetic recording signals can reproduce, with a high SNR and a low error rate, even the signals magnetically recorded with further narrow recording track pitches and the higher frequency, thereby making it possible to reproduce with high reliability. Therefore, the magnetic recording medium of the invention can be used advantageously as a magnetic tape for recording computer data. In addition, the method for reproducing the magnetically recorded signals according to the invention is useful as for reproducing systems of the magnetic tapes used for recording computer data.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A magnetic reproducing method, comprising the steps of:
   detecting, using a laminated head as a reproducing head, magnetic signals recorded on a magnetic recording medium comprising a flexible nonmagnetic support having thereon, in order, a nonmagnetic layer containing a nonmagnetic powder and a binder and a magnetic layer having a thickness in the range of from 0.2 to 0.6 μm and containing a ferromagnetic powder and a binder; and
   applying a PR1 signal treatment to reproduced signals, wherein the detecting of the magnetic signals has a signal-to-noise ratio of at least 12.0 dB and an error rate of less than $1 \times 10^{-3}$.

2. The method according to claim 1, wherein signals are magnetically recorded to have a recording track pitch of less than 9 μm.

3. The method according to claim 1, wherein a frequency of signals to be magnetically recorded is in the range of from 0.5 to 60 MHz.

4. The method according to claim 2, wherein a frequency of the signals to be magnetically recorded is in the range of from 0.5 to 60 MHz.

5. The magnetic reproducing method according to claim 1, wherein said magnetic layer has a thickness in the range of from 0.23 to 0.5 μm.

6. The magnetic reproducing method according to claim 1, wherein said magnetic layer has a thickness in the range of from 0.24 to 0.45 μm.

7. The magnetic reproducing method according to claim 1, wherein said magnetic recording medium has a total thickness in the range of from 3.0 to 6.0 μm, said nonmagnetic layer has a thickness in the range of from 0.3 to 1.8 μm and a combined thickness of said nonmagnetic and magnetic layers is in the range of from 0.4 to 2.0 μm.

8. The magnetic reproducing method according to claim 1, wherein said nonmagnetic powder comprises at least one metal oxide selected from the group consisting of titanium dioxide, α-alumina, α-iron oxide and chromium oxide, and carbon black.

9. The magnetic reproducing method according to claim 8, wherein the amount of said carbon black is in the range of from 3 to 20 parts by weight per 100 parts by weight of said metal oxide.

10. The magnetic reproducing method according to claim 8, wherein said nonmagnetic layer further comprises at least one lubricant selected from the group consisting of fatty acids and fatty acid esters.

11. The magnetic reproducing method according to claim 1, wherein said ferromagnetic powder is ferromagnetic alloy powder comprising Fe.

12. The magnetic reproducing method according to claim 11, wherein said ferromagnetic alloy powder has a saturation magnetization amount in the range of from 120 to 170 emu/g, a coercive force in the range of from 1900 to 2600 Oe, an average major axis length in the range of from 0.01 to 0.3 μm, and an average axial ratio in the range of from 5 to 20.

13. The magnetic reproducing method according to claim 11, wherein said magnetic layer further comprises at least one lubricant selected from the group consisting of fatty acids and fatty acid esters, carbon black and at least one abrasive selected from the group consisting of fused alumina, silicon carbide, chromium oxide, corundum, diamond and garnet.

14. The magnetic reproducing method according to claim 11, wherein said binder in said magnetic layer and in said nonmagnetic layer comprises a vinyl chloride resin, polyurethane resin and a polyisocyanate.

15. The magnetic reproducing method according to claim 1, wherein said magnetic recording medium further comprises a back coating layer provided on opposite side of said support with respect to the side having said magnetic layer.

16. The magnetic reproducing method according to claim 15, wherein said back coating layer comprises carbon black, an inorganic powder having the Moh's scale of hardness in the range of from 3 to 4.5, and an inorganic powder having the Moh's scale of hardness in the range of from 5 to 9.

17. The magnetic reproducing method according to claim 16, wherein said carbon black comprises first carbon black having an average particle size in the range of from 10 to 20 nm and second carbon black having an average particle size in the range of from 230 to 300 nm.

* * * * *